Dec. 22, 1959 A. ZOLLINGER 2,918,238
PIPE HANGER
Filed Aug. 20, 1958 2 Sheets-Sheet 1

INVENTOR.
ALFRED ZOLLINGER
BY David D. McKenney
ATTORNEY

Dec. 22, 1959  A. ZOLLINGER  2,918,238
PIPE HANGER
Filed Aug. 20, 1958  2 Sheets-Sheet 2

INVENTOR.
ALFRED ZOLLINGER
BY
David D. McKenney
ATTORNEY

United States Patent Office 2,918,238
Patented Dec. 22, 1959

2,918,238

PIPE HANGER

Alfred Zollinger, Providence, R.I., assignor to Grinnell Corporation, Providence, R.I., a corporation of Delaware Application August 20, 1958, Serial No. 756,179

9 Claims. (Cl. 248—54)

This invention relates to a hanger for maintaining a constant upward supporting force on a pipe. More precisely, it relates to improvements in motor-actuated constant support pipe hangers.

In certain constructions of motor hangers, the arrangement of elements includes a jack for moving the load vertically which rests upon and follows the motion of a displacement-sensing cell mounted on a frame. Motion of movable elements of the cell, corresponding to thermally-caused expansion and contraction movement of the supported pipe is detected and employed by a suitable switch arrangement to operate the jack to follow the thermally caused pipe movement.

In this arrangement one problem arises from the inherent lack of proportional movement of certain parts of the movable cell elements with changes in the load. If the movement of these cell element parts is employed to actuate the switch arrangement, a true picture of the load changes is not obtained, and undesirable variations in the support result. In the following a motor hanger is described in which this problem could arise and in which it is shown how the present invention solves this problem.

One ingenious motor hanger of the general arrangement referred to has a jack in the form of a vertically disposed screw member which has its lower end provided with a thrust bearing and which is mounted on the movable elements of a load cell. Other elements of this cell are fixed with respect to the hanger frame. The load is connected to a nut member which is threadedly engaged on the screw member and which is prevented from rotating with respect to the frame but which is allowed to move vertically with rotation of the screw member. Thus the weight of the load is transmitted to the frame through the vertical screw member, thrust bearing and load cell.

With changes in the "weight" of the load the movable elements of the load cell move slightly with respect to the fixed elements, and it is this relative motion which is employed to actuate the switches for the motor driving the screw member. In general this relative motion is quite small, for example in the order of .0012 of an inch, and it is customary to multiply it in some way before using it to actuate the switches.

It has been found that because of the inability to machine the parts exactly variations occur in the relative motion between certain parts of the load cell elements and the jack which are not due to changes in the weight of the load. These variations are particularly present at points on the elements spaced substantially from the axes of the jack and of the cell itself, and accordingly one object of the present invention is to provide a motor operated hanger of the kind referred to wherein the relative motion between the load and the frame which is due to changes in load weight and which is employed to actuate switches to control the motor is taken substantially at the axes referred to or in other words at the center line of the application of the load on the frame.

Another object is to provide a motor operated hanger of the type referred to in which the relative motion between the movable and fixed elements of a cell for sensing load changes is taken from a point on the longitudinal axes of a jack which is interposed between the load and the cell.

Another object is to provide a motor operated hanger of the type referred to in which the motion of one element of a cell for sensing load changes is applied to a switch mechanism at substantially the center line of action of the load on the cell.

Another object is to provide a motor operated hanger of the type referred to in which the motion of one element of a cell for sensing load changes is applied to a motion multiplying device at substantially the center line of action of the load on the element.

Another object of the invention is to provide a motor operated hanger as set forth in any of the objects which is relatively simple in construction, reliable in service, inexpensive and easily repaired.

Other objects will appear herewith.

The best mode in which I have contemplated applying the principles of my improvements is shown in the accompanying drawings, but these are to be deemed merely illustrative for it is intended that the patent shall cover by suitable expression in the appended claims whatever of patentable novelty resides in the invention disclosed.

Figure 1:
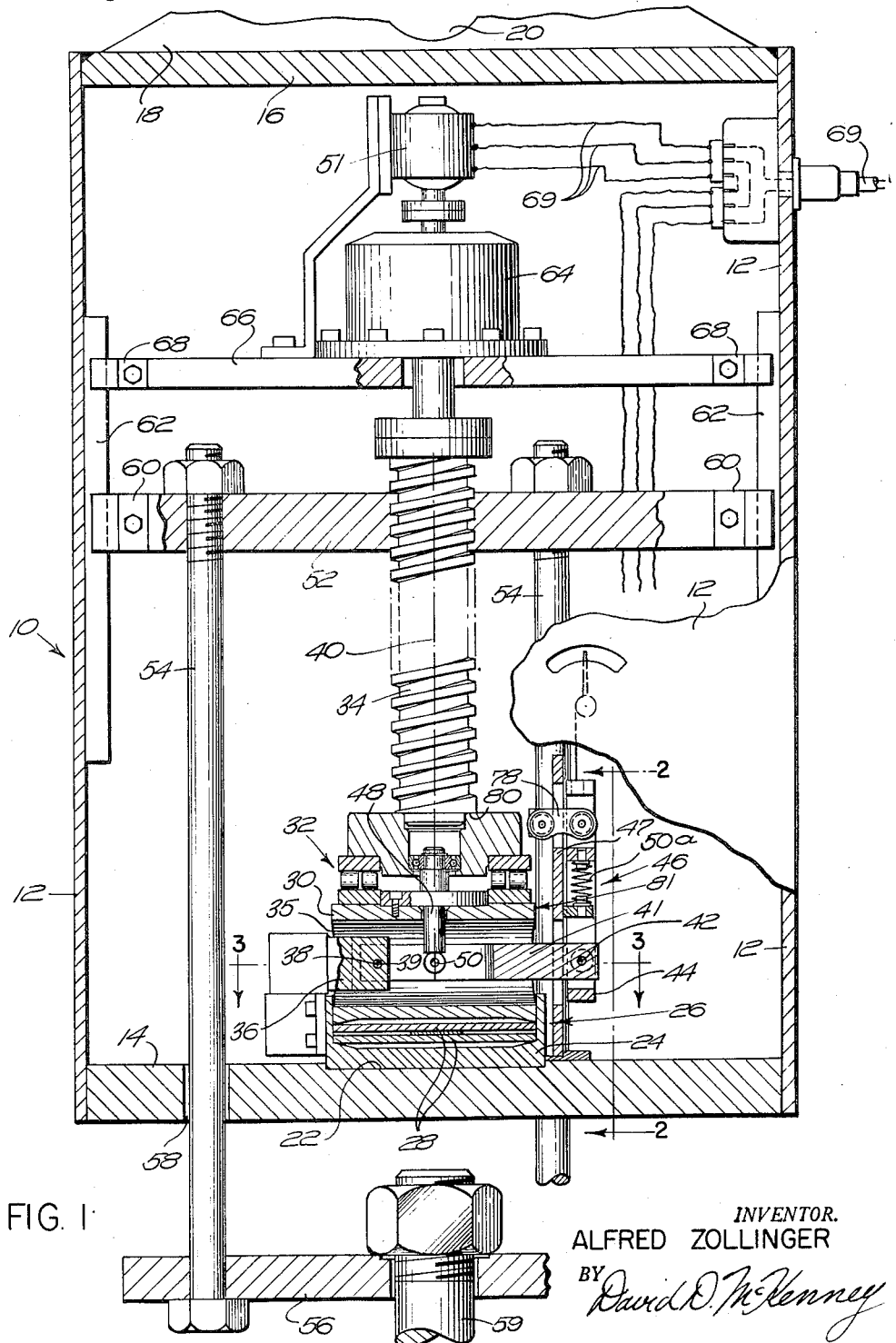
Figure 1 is a side elevation view, partly cross-sectioned, of one embodiment of the present invention.

Referring now to the drawings, the numeral 10 generally denotes a hanger embodying one form of this invention and includes a frame casing 12 with lower and upper end plates 14 and 16, respectively, secured to its ends in any convenient manner, as by welding. Upper end plate 16 provided with a pair of brackets 18 having aligned apertures 20 for pivotal mounting to a suitable fixed overhead support. Lower plate 14 is provided on its upper surface with a central shallow recess 22 which receives and aligns the bottom of a casing 24 of a load cell 26 which is sensitive to changes in load weight. More particularly this cell includes a series of nested disc springs 28 within the casing 24 and held in alignment thereby and a thick top cap or piston 30 resting upon the uppermost disc spring and also held in alignment by the casing. The top cap 30 in turn has resting thereon an annular thrust bearing 32 which supports one end of a vertical screw member 34.

The top cap 30 is provided with a large transverse opening 35 which extends completely therethrough and in one end of which there is located a bearing projection 36 fixed with respect to the lower frame plate 14, for example, by being secured to the outer surface of the cell casing 24. The bearing projection is spaced substantially from the wall of the transverse opening 35 to permit relative movement of the top cap with respect to the bearing projection and has its end provided with a pivot 38 having an axis 39 perpendicular to the longitudinal axis 40 of the vertical screw member. An arm 41 is also located within the transverse opening 35 and spaced substantially from the walls thereof with one of its ends pivotally connected to the bearing projection 36 at the pivot 38. A pin connection 42 is located at the other end of the arm 41 and secures this end to the movable armature 44 of an assembly 46 of electrical switches. This assembly includes four separate switches and is fixedly secured in any suitable manner to a plate 47 mounted on the frame. A projection 48 axially aligned with the longitudinal axis 40 of the screw member 34 (and with the axis of the cell) is secured to the top cap 30 and extends downwardly into the transverse opening 35 with its lower end engaging a roller 50 on the arm 41 at a distance spaced from the pivot 38. Spring 50a between the plate 47 and the armature 44 keeps the projection 48 in contact with the roller 50. The ratio of the distance from pivot 38 to the pivot 50 to the distance from pivot 38 to pin 42 is greater than one so that when the projection 48 moves vertically (as will be explained) with respect to the bearing projection 36 the motion of this projection 48 is multiplied at the switch assembly.

The thrust bearing 32 is employed because the screw member is rotated about its longitudinal axis 40 with respect to the frame by a motor 51 to drive a nut member 52 along the screw member in accordance with movements of the load which is secured to the nut member. The thrust bearing 32 permits the top cap 30, cell 26, and switch assembly 46 to remain non-rotated with respect to the frame.

More particularly the nut member 52 is threaded on the screw member and has rods 54 suspended from it, the lower ends of these rods being secured to a yoke 56. These rods pass slidably through openings 58 in end plate 14. The yoke 56 carries at its center another rod 59 the lower end of which is secured to a section of a piping system (not shown) which is to be supported by the hanger of this invention and which constitutes the load. Peripheral parts of the nut member are provided with guides 60 which slidably engage tracks 62 fixedly secured to the interior of casing 12 to preclude rotation of the nut member 52 relative to the casing upon rotation of screw member 34.

The upper end of screw member is connected to a gear reduction mechanism 64 which in turn is driven by the reversible motor 51.

Both the motor and the reduction mechanism are fixedly secured to a platform 66 through which the screw member 34 extends. The platform 66 is also provided with guides 68 which slidably engage the same tracks 62 to preclude rotation of the platform relative to the casing 12.

Suitable electrical leads 69 bring power from a source (not shown) to the switch assembly and motor 51 in such a way that the switch will control the motor.

The operation of the above-described embodiment is as follows. Assume that the pipe section supported by the hanger weighs 60,000 pounds. Due to the contraction of the vertically disposed sections of pipe in the systems because of a cooling of the pipes the section supported moves vertically downward. This will result in an apparent increase in the weight of the load for example to a value of 61,200 pounds. This additional load would increase very rapidly with slight movement and if it becomes too large will result in undesired stresses in the system. In order to relieve this stress the yoke 56 must follow the downward movement of the pipe section it supports. This following takes place because the additional load of 1200 pounds causes the resilient disc springs 28 to be additionally deflected a slight amount. These springs are already deflected substantially because they carry the entire 60,000 pound load. When this additional deflection occurs the top cap 30 will move downward relative to the bearing projection 36 which is fixed in relation to the frame casing.

This moves the projection 48 vertically downwardly and rotates the arm 41 about its pivot 38 in a clockwise direction (Fig. 1) and moves the switch armature 44 downward. The downward motion of the projection 48 is multiplied at the switch assembly because of the ratio previously mentioned. The switch assembly is such that when the downward motion of the armature indicates an increase in load of 1200 pounds one of the switches 70 (see Fig. 2) is closed by the movement of a cross bar 71 on the armature 44, and this completes a circuit to the motor 51, turning on the motor in a direction to drive the nut member downwardly along the screw member. The rotation of the screw member is such that the nut member moves downward faster than the downward movement of the piping due to the thermal contraction so that the apparent load on the hanger begins to decrease, and the deflection in the disc springs 28 which was due to the additional 1200 pounds begins to disappear. This causes the projection 48 to move upwardly and rotate the arm clockwise. When the upward motion of the switch armature indicates that the force exerted by the load on the hanger is again 60,000 pounds another switch 72 is operated by the cross bar 71 to turn off the motor.

In the event of an expansion of the vertical risers in the piping system the hanger "sees" a lesser load. For example, this load may decrease to 58,800 pounds. This decrease results in a decrease in the total deflection of the disc springs and an upward movement of the top cap 30 with respect to the frame. This causes a counterclockwise rotation (in Fig. 1) of the arm 41, and when this rotation indicates that the load on the hanger has decreased to the 58,800 pound value a third switch 74 in the switch arrangement is closed by the movement of second cross bar 75 on the armature, and this completes a circuit which turns on the motor in a direction to move the nut member upwardly on the screw member. This movement causes the hanger to pick up more load and the arm 41 to again rotate downwardly, and when this rotation indicates that the load "seen" by the hanger is again 60,000 pounds, a fourth switch 76 is operated by the cross bar 75 to open the circuit to the motor and turn off the motor.

The switch assembly armature 44 has its upper end guided by a link 78 pivoted at one end to the armature and pivoted at the other end to the plate 47.

The particular arrangement for actuating the switch, including the transverse opening 35, projection 48 and pivoted arm 41, accomplishes the detection of motion caused by load changes at the axis of the screw member, thrust bearing and cell. In addition it multiplies this motion. The particular arrangement employed for this detection and magnification represents a solution to the problem which was mentioned earlier and which is caused by the coupling between the frame and the screw 56. Due to manufacturing tolerances, it is not possible to remove all irregularities in the thrust bearing and screw member. The result is that because of the rotation of the screw member and portions of the thrust bearing relative movement at the periphery of the top cap would not necessarily give a true picture of the load changes but may be partially due to slight wobbling of the rotating parts. This is particularly true the greater the distance from the axis of screw member. By detecting the motion at or as near as possible to the axis of the screw member such wobbling motion due to the irregularities are minimized. This will be better understood when it is appreciated that the range of movement of the projection 48 with respect to the frame during load changes may be as little as .0012 of an inch. An irregularity in the formation of the surface 80 of the lower end of the screw member where it rests on the thrust bearing would be multiplied at the periphery 81 of the top cap by more than 2 in Fig. 1, so that if the irregularity were only .001 of an inch it would produce a wobbling movement of at least .002 of an inch at the periphery of the top cap. In practice an abutment would be secured to the periphery of the cap to actuate the switch assembly and in Fig. 1 this would increase the wobbling movement to .003 of an inch. This would be 250% of the range of movement of the cell due to load changes, or in the case of the 60,000 pound load previously described a possible variation in 3000 pounds rather than the desired 1200 pounds. Larger manufacturing tolerances would produce proportionately larger variations.

Figure 4:
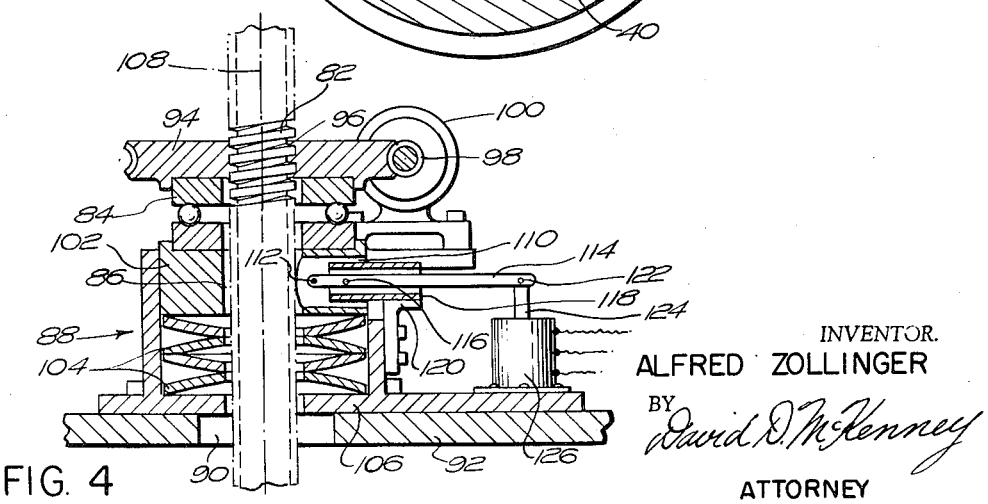
Figure 4 is a fragmentary view of another embodiment of the invention.

Referring to Fig. 4 this shows another embodiment of the invention in which, because of the arrangement of the jack, the motion of the load cell due to changes in load cannot be taken exactly at the axis of the jack but in which this motion taken as near thereto as possible.

More particularly this embodiment has a non-rotating screw member 82 which passes freely through an annular thrust bearing 84, a central passage 86 in the load cell 88 and an opening 90 in the frame 92. The load (not shown) is secured to the lower end of the screw member. The nut member for the jack is a worm wheel 94 having a threaded central opening 96 engaging the screw member and rotated by a worm gear 98 driven by a motor 100 mounted on the top cap or piston 102 of the load cell.

Thus the weight of the load is transmitted to the frame 92 through the screw member 82, worm wheel 94, thrust bearing 84, top cap 102 of the load cell, disc springs 104 in the load cell and a casing 106 for the top cap and disc springs.

The presence of the screw member in the load cell's central passage 86 prevents taking the load cell motion from the axis 108 of the screw member and load cell, but a transverse passage 110 in the top cap extends into this passage and is provided with a pivot 112 at its inner end to which an arm 114 is connected. This arm is also pivoted at 116 near the pivot 112 to a member fixed with respect to the frame, which member is conveniently a pipe section 118 receiving the arm 114 therethrough and extending inwardly in the transverse passage 110. This pipe section is fixed with respect to the frame by a bracket 120 mounting its outer end on the side of the load cell casing 106.

Figure 2:
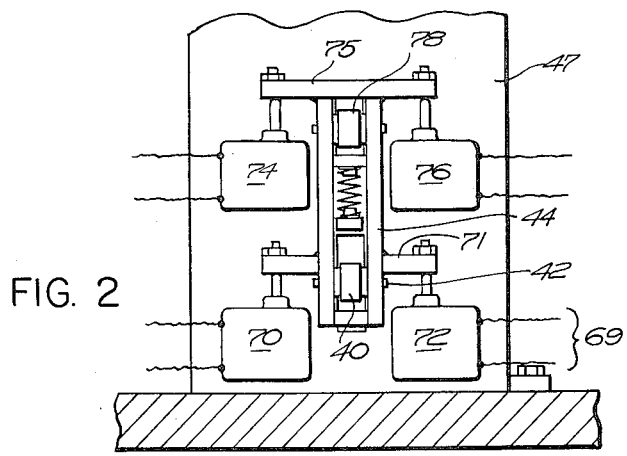
Figure 2 is a view taken on line 2—2 of Figure 1.
Figure 3:
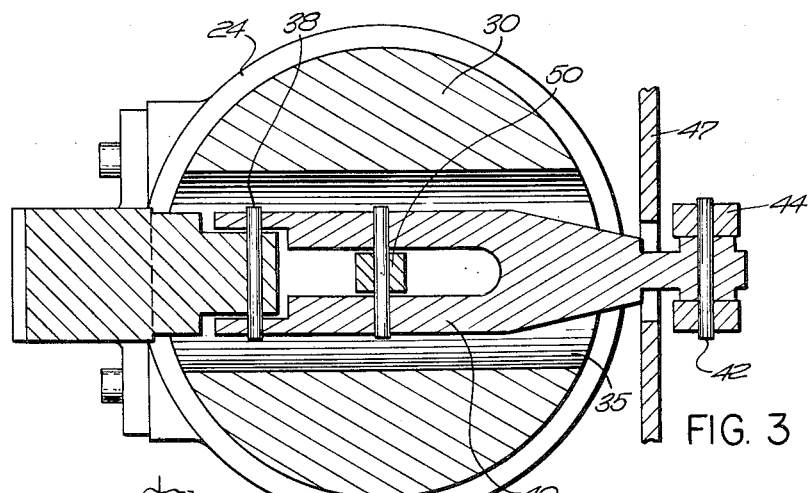
Figure 3 is a view taken on line 3—3 of Fig. 1.

At its outer end the arm 114 is pivotally connected at 122 to the armature 124 of a switch assembly 126 similar in arrangement and operation to that of Fig. 1. The ratio of the pivot distances 116—112 and 116—122 is less than one so that the motion of the top cap taken at pivot 116 is multiplied at pivot 122.

I claim:

1. A motor operated constant support pipe hanger comprising a frame adapted to be secured to fixed structure, a jack having a first member rotatable with respect to the frame and having a second member in threaded engagement with said first member and fixed against rotation with respect to said frame, means for connecting a pipe load to one of said jack members, means interposed between the frame and the other of said jack members for transmitting the weight of the load to said frame, said means including an element movable substantially parallel to the center line of action of the load on said frame with changes in said load, a motor connected to the rotatable jack member to rotate said rotatable jack member, a switch electrically connected to said motor to turn said motor off and on, and means for connecting said switch to said movable element adjacent the said center line of the load weight.

2. A motor operated constant support pipe hanger comprising a frame adapted to be secured to fixed structure, a jack having a first member rotatable with respect to the frame and having a second member in threaded engagement with said first member and fixed against rotation with respect to said frame, means for connecting the pipe load to one of said jack members, means interposed between the frame and the other of said jack members for transmitting the weight of the load from said other jack member to said frame, said means including a fixed element resting on said frame and distributing the load weight over a frame area, said means also including a movable element movable with changes in load substantially parallel to the direction in which the load weight acts on said frame over said area, a motor connected to the rotatable jack member for rotating said rotatable jack member, a switch electrically connected to said motor to turn said motor off and on, and means connecting said switch to a point on said movable element adjacent a line through the geometric center of said frame area and parallel to said direction for actuating said switch with the motion of said movable element at said point.

3. A motor operated constant support pipe hanger for supporting a pipe load which is subject to vertical movement through a limited range due to thermal expansion and contraction in the piping system, said hanger comprising a frame adapted to be secured to fixed structure, a jack having a first member rotatable with respect to the frame and having a second member in threaded engagement with said first member and fixed against rotation with respect to said frame, means for connecting the pipe load to one of said jack members, means interposed between the frame and the other of said jack members for transmitting the weight of the load from said other jack member to said frame, said means including an element movable with respect to said fixed element and a resilient element between said fixed and movable elements, said movable element moving with changes in the load which change the deflection of said resilient element along a line substantially parallel to the direction in which the load acts on said frame over said area, a motor connected to the rotatable jack member for rotating said rotatable jack member, a switch electrically connected to said motor for turning said motor off and on, and a linkage pivoted at a point fixed with respect to said frame and engaging both a point on said movable element and said switch, said point on said movable element being substantially on a line which passes through the geometric center of said frame area and which is parallel to said direction, whereby said switch is actuated by motion of said point on said movable element.

4. A motor operated constant support pipe hanger for supporting a pipe load which is subject to vertical movement through a limited range due to thermal expansion and contraction in the piping, said hanger comprising a frame adapted to be secured to fixed structure, a jack having a first member rotatable with respect to said frame and having a second member in threaded engagement with said first member and fixed against rotation with respect to said frame, means for connecting the pipe load to one of said jack members, thrust bearing means located between said rotatable jack member and said frame, means interposed between said thrust bearing and said frame for transmitting the weight of the load from said rotatable jack member to said frame in one direction, said means including an element fixed with respect to said frame and engaging said frame over an area thereof for distributing the load weight over said area, said means also including an element movable with respect to said frame and said fixed element, and said means also including a spring element between said fixed and movable elements and deflected along a line substantially parallel to said one direction by the weight of the load, said deflection changing with changes in the weight of the load to move the movable element along said line, a motor connected to the rotatable jack member for rotating said rotatable jack member, a switch electrically connected to said motor for turning said motor off and on, and a lever pivoted at one point thereon to a point fixed with respect to said frame and having another point thereon engaging said switch, said lever having a third point engaging a portion of said movable element, and said movable element portion being substantially on a line which passes through the geometric center of said frame area and which is parallel to said direction, whereby said switch is actuated by rotation of said lever caused by movement of said movable element.

5. A motor operated hanger according to claim 1 wherein said movable element comprises a plate arranged at substantially a right angle to said line of action of the load and further arranged with said line of action passing through substantially the geometric center of said plate, said plate having a passageway therein extending from the edge thereof substantially to said line of action and at substantially a right angle to said line of action, and said connecting means having at least a portion located within said passageway.

6. A motor operated hanger according to claim 1 wherein said movable element comprises a plate having one surface presented toward said jack, having an opposite surface presented toward said frame and having an edge surface extending around said plate between said two first mentioned surfaces, said plate being arranged with the geometric centers of said two first-mentioned surfaces substantially on said center line of action of the load, said plate having a passageway therein extending inwardly from the edge surface thereof substantially to said center line, and said connecting means comprising a lever having at least a part lying within said passageway.

7. A motor operated hanger according to claim 1 wherein the means interposed between the frame and the other of said jack members comprises a load cell having a spring and wherein said movable element is a cap for said spring, said spring and spring cap having concentric longitudinal axes substantially coincident with said center line of action of the load, said spring cap having a passageway therein extending inwardly from the outer edge thereof substantially to said axes, and said connecting means comprising a lever pivoted with respect to said frame and engaging said spring cap within said passageway adjacent said axes.

8. A motor operated hanger according to claim 1 wherein said movable element has a hollow space adjacent said center line of action of the load and in which at least a part of said connecting means is within said hollow space.

9. A motor operated hanger according to claim 1 wherein the means interposed between the frame and the other of said jack members comprises a substantially cylindrical load cell having a longitudinal axis substantially coincident with said center line of action of the load, wherein said movable element is a piston in said load cell having a hollow space substantially at said axis and having a communicating passage from said hollow space to the exterior of said piston, and wherein said connecting means extends through said passageway to said hollow space and comprises means for transmitting motion from a point on said piston which is inside said hollow space and adjacent said axis to a point exterior of said piston.

References Cited in the file of this patent
UNITED STATES PATENTS 2,248,730    Wood ---------------- July 14, 1941